US012686284B2

(12) United States Patent
Gardes et al.

(10) Patent No.: US 12,686,284 B2
(45) Date of Patent: Jul. 21, 2026

(54) MOTOR CONTROL SYSTEM WITH ELECTRIC SAFETY BRAKING

(71) Applicant: EZ-WHEEL, La Couronne (FR)

(72) Inventors: Florian Gardes, Gond-Pontouvre (FR); Antoine Juan, Angouleme (FR)

(73) Assignee: EZ-WHEEL, La Couronne (FR)

( * ) Notice: Subject to any disclaimer, the term of this patent is extended or adjusted under 35 U.S.C. 154(b) by 35 days.

(21) Appl. No.: 18/840,188

(22) PCT Filed: Feb. 20, 2023

(86) PCT No.: PCT/FR2023/050237
§ 371 (c)(1),
(2) Date: Aug. 21, 2024

(87) PCT Pub. No.: WO2023/161580
PCT Pub. Date: Aug. 31, 2023

(65) Prior Publication Data
US 2025/0162427 A1 May 22, 2025

(30) Foreign Application Priority Data
Feb. 22, 2022 (FR) ...................................... 2201576

(51) Int. Cl.
B60L 15/20 (2006.01)
B60L 50/40 (2019.01)
(Continued)

(52) U.S. Cl.
CPC ........... B60L 15/2009 (2013.01); B60L 50/40 (2019.02); B60L 50/52 (2019.02); H02P 3/18 (2013.01);
(Continued)

(58) Field of Classification Search
CPC ...... B60L 15/2009; B60L 50/40; B60L 50/52; B60L 2220/16; B60L 2240/12;
(Continued)

(56) References Cited

U.S. PATENT DOCUMENTS

2009/0206654 A1* 8/2009 Colin .................... B60T 8/1703
303/121
2019/0256018 A1 8/2019 Taoka et al.

FOREIGN PATENT DOCUMENTS

EP 2570291 3/2013
EP 3618259 3/2020

OTHER PUBLICATIONS

International Search Report for application No. PCT/FR2023/050237 dated Apr. 26, 2023.

* cited by examiner

*Primary Examiner* — Rodney A Butler
(74) *Attorney, Agent, or Firm* — Perman & Green, LLP

(57) ABSTRACT

A motor control system for an electric vehicle has a brushless DC motor. An electronic system for controlling the motor includes a main electrical supply device supplying power half-bridges for supplying phases of the motor and provided with upper arms, which are equipped with first electronic switches, and lower arms, which are equipped with second electronic switches. A programmable computer controls the first and second electronic switches to implement a first drive mode of the motor, and a second freewheeling mode. A safety circuit produces an emergency braking mode and has third electronic switches for short-circuiting the lower arms of the half-bridges in parallel with the second electronic switches. The third electronic switches are controlled by an additional switching circuit suitable for closing the third switches in order to perform the emergency (Continued)

braking. The additional switching circuit is supplied by a secondary electrical supply device.

20 Claims, 3 Drawing Sheets

(51) Int. Cl.
    *B60L 50/52*           (2019.01)
    *H02P 3/18*            (2006.01)

(52) U.S. Cl.
    CPC ....... *B60L 2220/16* (2013.01); *B60L 2240/12* (2013.01); *B60L 2260/26* (2013.01)

(58) Field of Classification Search
    CPC .... B60L 2260/26; B60L 3/003; B60L 3/0076; B60L 3/0092; B60L 7/003; B60L 3/0046; H02P 3/18; H03K 17/06

See application file for complete search history.

MOTOR CONTROL SYSTEM WITH ELECTRIC SAFETY BRAKING

CROSS REFERENCE TO RELATED APPLICATIONS

This application is a National Stage of International Application No. PCT/FR2023/050237, having an international filing date of 20 Feb. 2023, which designated the United States of America, and which International application was published under PCT Article 21(2) as WO Publication No. 2023/161580, which claims priority from and the benefit of French Patent Application No. 2201576 filed on 22 Feb. 2022, the disclosures of which are incorporated herein by reference in their entireties.

BACKGROUND

Field

The disclosure pertains to the field of electric vehicles or systems such as motorized trucks that are autonomous or guided by an external control system, such as industrial trucks for automated warehouses, or the like.

Brief Description of Related Developments

It is known to produce autonomous electric vehicles such as mobile robots that move around premises, such as automated warehouses, to load and unload packages or mobile robots performing tasks, such as floor cleaning, for example.

Such a vehicle has one or more electric motors to drive the wheels of the vehicle, an on-board computer for managing operation of the motors, a power supply battery for the motor or a powered rail in the case of trucks on rails, and optionally a board for communicating with a remote control center providing the on-board computer with movement instructions for the vehicle.

Technical Problem

Safe operation of these vehicles requires the permanent ability to brake said vehicles, even in the event of a loss of power to the motor or motors, and it is known to fit these vehicles with a mechanical emergency braking device or an electromagnetic brake, which are cumbersome and comprise wearing parts.

Document EP 3618259 A1 relates to a device in which the switches of a lower half-bridge are short-circuited using a voltage loss detection circuit and an emergency power supply. This device is complex and does not permit braking to be maintained or controlled during freewheel phases.

SUMMARY

In consideration of the prior art, the present application proposes a motorization control system for an electric motor of a mobile electric vehicle provided with an electric braking device that is used in the event of a loss of power to the controller of the motor, this device also being usable as a controlled braking device during freewheel phases.

For this purpose, the present disclosure proposes a motorization control system for a mobile electric vehicle comprising an at least three-phase brushless DC motor, an electronic control system for controlling said motor comprising a main electrical supply device supplying power to power half-bridges that supply power to said phases of the motor and that are provided with upper arms fitted with first electronic switches and lower arms fitted with second electronic switches, said control system further comprising a programmable computer for controlling said first and second electronic switches, by means of control outputs for said electronic switches, to produce at least a first, drive mode of the motor, based on sequential switching control of the switches to create the rotating electric field that turns the motor, and a second, freewheel mode, in which the electronic switches of said power half-bridges are open, which comprises a safety circuit that is designed to produce an emergency braking mode FS and that is provided with third electronic switches for short-circuiting the lower arms of the half-bridges in parallel with said second electronic switches, said third electronic switches being controlled by an additional switching circuit that is provided with a detection channel for detecting an interruption of the main electrical supply device and/or with a control channel from said programmable computer and that is designed to close said third switches in order to produce said emergency braking, said additional switching circuit being supplied with power by a secondary electrical supply device.

Advantageously, said additional switching circuit comprises an inhibit output for the control outputs for said first and second switches so as to force said first switches and second switches into the open position when said third switches are closed.

Advantageously, the secondary electrical supply device is produced by a capacitor or supercapacitor energy reserve.

According to a complementary or separate aspect, the system is configured to provide three operating modes: a first mode comprising supplying power to the motor to provide traction for the vehicle, a second mode, in which the motor is freewheeling, and a third mode, in which the motor is electrically braked.

For this purpose, the motorization control system for a mobile electric vehicle is such that the computer comprises a configuration programming mode comprising a traction configuration T, in which the computer controls the first and second electronic switches based on said sequential control, a freewheel configuration RL, in which the computer controls the first and second electronic switches to open, and a motor braking configuration F, in which the computer controls the second electronic switches to simultaneously close and the first electronic switches to simultaneously open in a short-circuit mode of the phases of the motor, said computer having an operating mode designed to implement said configurations in accordance with control phases of said mobile vehicle.

The mobile vehicle being a remote-controlled wheeled vehicle, said configurations may be initiated by controls received by the computer over a communication link from an external controller.

The vehicle being a wheeled vehicle actuated by a manual control, the computer may be programmed to initiate the freewheel configuration following release of the manual control.

The vehicle being a wheeled vehicle actuated by a manual control, the computer may be programmed to initiate the motor braking configuration following release of the manual control.

The vehicle being a wheeled vehicle actuated by a manual control, the computer may be programmed to initiate the motor braking configuration F beyond a maximum speed of movement MAX of said vehicle.

The computer may be programmed to initiate the motor braking configuration F following release of the manual control, in order to immobilize the vehicle, then to initiate the freewheel configuration when the vehicle has stopped, in order to enable the vehicle to be moved freely by hand.

The computer may have a mode for maintaining the motor braking configuration when the motor has stopped, in order to park the vehicle.

The present disclosure also relates to a mobile electrically motorized vehicle comprising at least one wheel associated with a motor controlled by the control system as described above.

BRIEF DESCRIPTION OF THE DRAWINGS

Other features, details and advantages of the disclosure will become apparent on reading the following detailed description of non-limiting example aspects, and on analyzing the appended drawings, in which.

DETAILED DESCRIPTION

The drawings and the description below include elements that may not only make the present disclosure easier to understand but also contribute to the definition thereof, where appropriate.

Figure 1:
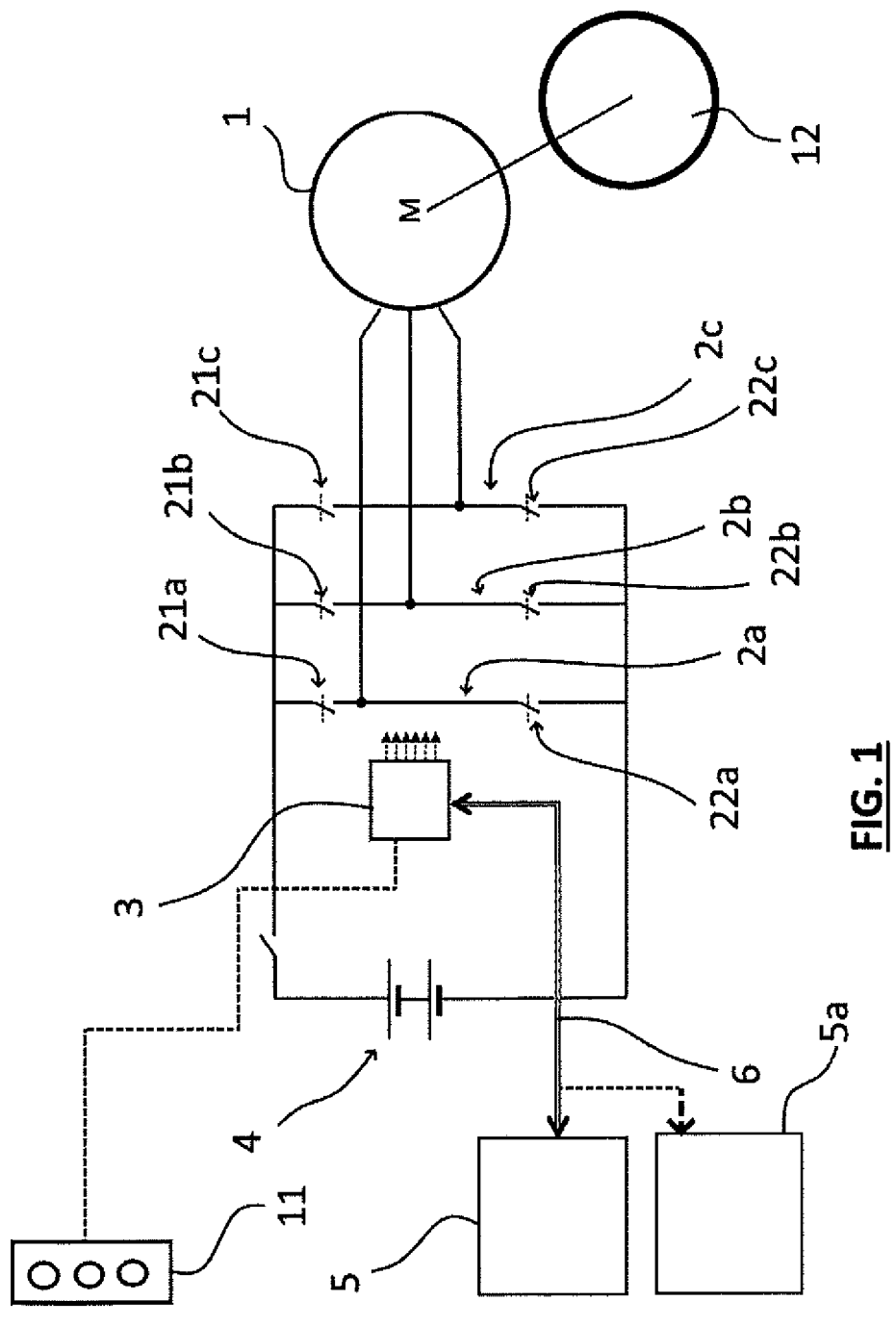
FIG. 1 is a simplified diagram of a first aspect of a motorization control system.
Figure 2:
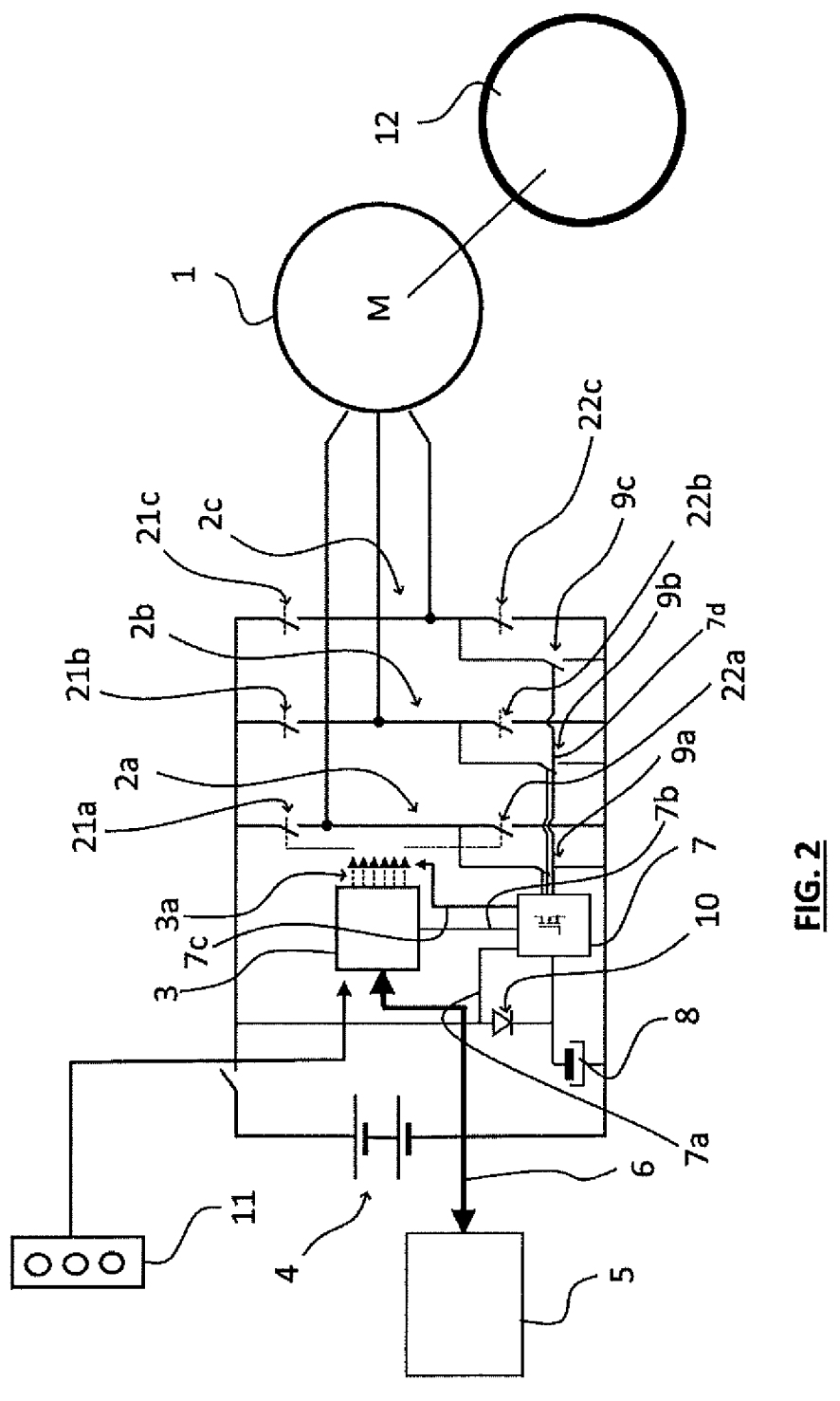
FIG. 2 is a simplified diagram of a second aspect of a motorization control system.

The present disclosure relates to aspects of motorization control systems for at least one wheel 12 driven by a motor 1, as shown in FIGS. 1 and 2. The wheel 12 may be a wheel of a wheeled vehicle such as an industrial truck which may comprise one motorization control system per wheel, the systems optionally being synchronizable or controllable separately to permit directional control of the truck by adapting the speeds of each wheel, or the system can control two wheels depending on the configuration of the wheeled vehicle.

The motorization control system according to a first example aspect shown in FIG. 1 comprises an electronic control system for controlling said motor comprising a main electrical supply device 4 supplying power to power half-bridges 2a, 2b, 2c that supply power to said phases of the motor and that are provided with upper arms fitted with first electronic switches 21a, 21b, 21c and lower arms fitted with second electronic switches 22a, 22b, 22c, said electronic control system further comprising a programmable computer 3 for controlling said first and second electronic switches by means of control outputs 3a for said electronic switches.

More specifically, the system is made up of at least:

a.—A three-phase brushless DC motor (BLDC) 1;

b.—An electronic system with three power half-bridges 2a, 2b, 2c, i.e. six MOSFET or IGBT electronic power switches, three first switches 21a, 21b, 21c on upper branches of the half-bridges and three second switches 22a, 22b, 22c on lower branches of the half-bridges;

c.—A programmable computer 3 for controlling the six switches independently of one another;

d.—A main power source such as a battery 4 inside or outside the system.

The motorization control system may be connected to a computerized parameterization tool such as an external controller 5 or a laptop computer or tablet 5a over a communication link 6, which may be wired or wireless.

The system is not limited to the three-phase configuration shown or to a configuration with single switches on the branches of the half-bridges, but may comprise a greater number of phases and parallel switches on the branches, depending on the electrical power of the motor being controlled.

In this configuration, the computer controls the electronic switches of the three half-bridges sequentially to create the rotating electric field that causes the motor to turn. In addition to sequential control, according to the present disclosure, the computer is configured to control the switches in two different ways to bring about different behaviors in the motor:

a.—Open the six switches to allow the motor to turn freely without producing electrical current in the phases, this mode being referred to as "freewheel";

b.—Close the three second electronic switches 22a, 22b, 22c on the lower branches and open the three first electronic switches on the upper branches, which creates a short-circuit current between the three phases of the motor during rotation thereof and gives rise to a resistive magnetic force opposing this rotation, this mode being referred to as "motor braking".

In this aspect, the computer and the half-bridges need to continue to be supplied with power if the motor is to be braked. It is also necessary for the control switching of the computer to open the switches on the upper branches when the switches on the lower branches are simultaneously closed.

As set out above, when a mobile vehicle is motorized, the control system permits movement to be obtained without actuating the motorization and without resistance from the motor in "freewheel" mode, or conversely helps to decelerate or immobilize the vehicle in "motor braking" mode.

It is therefore useful to be able to parameterize the operating mode of the power switches, and especially to be able to combine different modes depending on usage phases. Combining modes provides a wide range of options for the settings determining the behavior of the motorization system.

To make the different combinations of behaviors accessible to the user of the system, the computerized parameterization tool may be part of an external controller 5 connected to the computer 3 via a USB, CAN, Ethernet, or Wi-Fi communication link 6, or another data interchange means, such as infrared. The computerized tool hosts parameterization software enabling the user to select the desired switching modes depending on the usage modes of the motorization.

Figure 3:
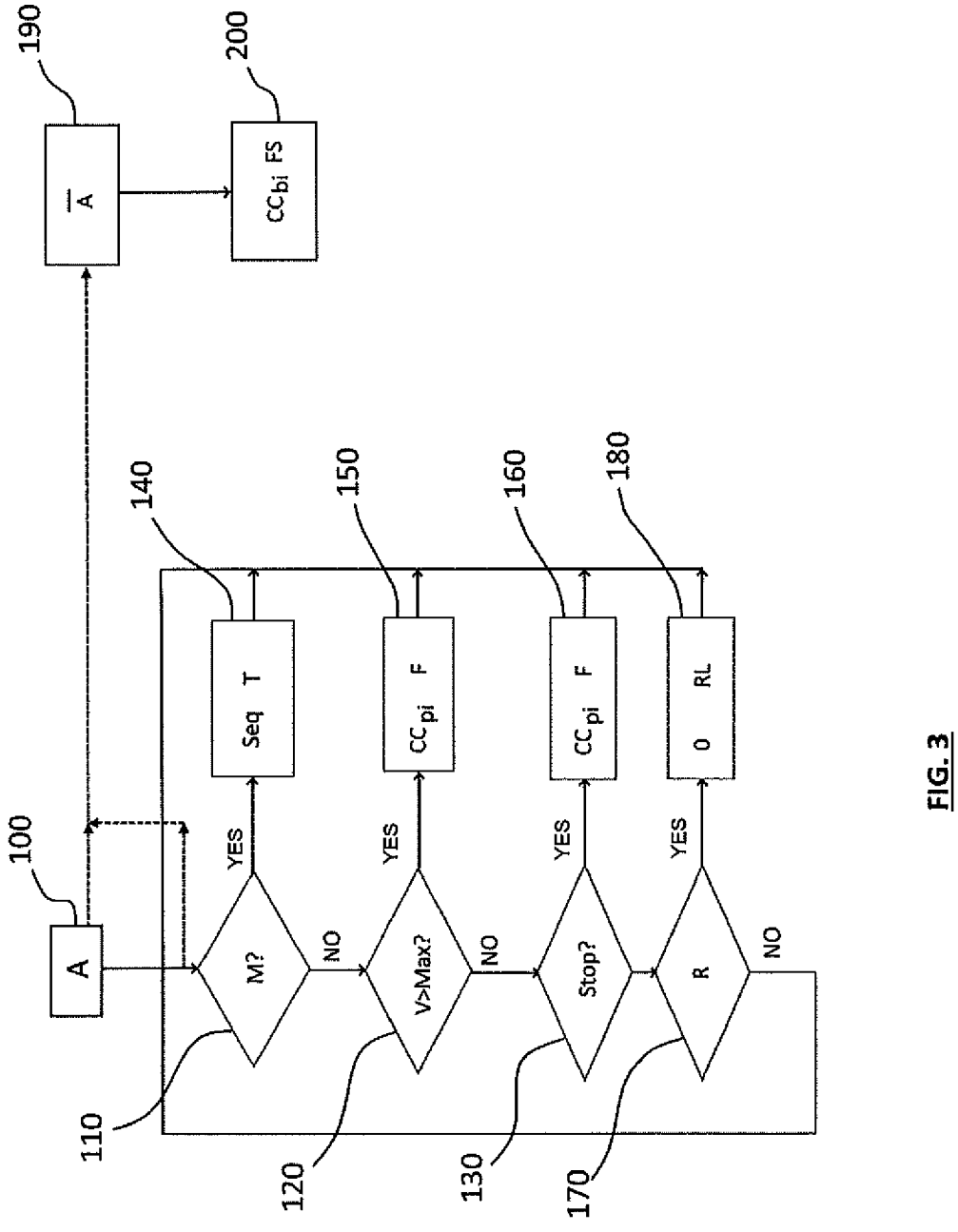
FIG. 3 schematically shows operating modes of a described motorization control system.

When the motorization of a wheeled vehicle is actuated by a manual control such as the control 11, these options, shown schematically in FIG. 3, may for example be:

a.—Sequential operation Seq 140 of the switches to drive the motor and the traction T of the vehicle following generation of a manual start control M 110;

b.—Changeover to freewheel RL 180 as a result of the electronic switches on the upper arms and on the lower arms opening following release R 170 of the manual control, to move with no electric drive, or c.—Changeover to motor braking F 160 as a result of the first switches opening and the second switches CCpi closing following a stop control Stop, to help to decelerate the vehicle by means of electric braking. This can also be done following release R of the manual control instead of changing over to freewheel 180;

d.—Changeover to motor braking F 150 if the speed V of the vehicle exceeds a maximum defined speed MAX 120, thereby permitting the maximum speed of movement to be adjusted;

e.—Changeover to motor braking F following release of the manual control, in order to immobilize the vehicle, then toggling to "freewheel" RL 180 at zero speed to enable the vehicle to be moved freely by hand;

f.—Maintenance of "motor braking" in order to park the vehicle.

Control using the operating modes described above is particularly suited to industrial trucks with handling assistance. The braking mode provided by short-circuiting the phases saves electricity, since the braking is produced by short-circuiting the motor phases and not by actuating an electric braking device, and also increases safety if the vehicle is travelling too fast, by limiting the speed, and permits the speed of the vehicle to be adjusted, optionally in combination with the freewheel mode.

FIG. 3 thus schematically shows the operating modes possible on the basis of a power supply A 100 for the system with normal sequential control operation Seq 140 of the electronic switches following a start instruction M 110 for the vehicle: changeover to short circuit 150 for the electronic switches on the lower arms and open the switches on the upper arms of the half-bridges in order to change over to motor braking if the speed of the vehicle has exceeded a maximum speed Max during the test 120, changeover to short circuit 160 for the electronic switches on the lower arms and open the switches on the upper arms of the half-bridges in order to change over to motor braking following release of the manual control or the stop instruction during the test 130, open the electronic switches on the lower and upper branches of the half-bridges 180 following detection of an instruction to change over to freewheel 170, release the control or detect zero speed. This permits braking if the power supply A is present, while keeping the switches of the half-bridges open.

In the event of absence or loss of power $\overline{A}$ 190, braking by closing the third switches 9a, 9b, 9c and short-circuiting the phases CCbi produces a safety motor braking function FS in step 200.

Control of these different modes by the computer and control of the power switches is only possible if there is power. For battery-powered systems, a loss of power during operation is possible if the battery is flat or unable to supply current.

In this case, the loss of the braking function may be problematic at the time of the power loss, especially if this function is activated to keep a vehicle stationary and parked. Uncontrolled loss of the braking function may represent a safety risk.

The control system according to the aspect in FIG. 2 corresponds to an aspect that comprises a safety circuit that short-circuits the lower branches to safeguard the braking function for a given time after a loss of electrical energy. This system comprises an additional switching circuit 7, optionally parameterizable or programmable, that is provided with at least one channel 7a for detecting an interruption of the main power supply and that comprises a switching designed to generate a control signal to close the third switches 9a, 9b, 9c, over a control channel 7d, said third switches being wired in parallel with the second switches 22a, 22b, 22c on the lower branches of the half-bridges to provide an emergency stop function by short-circuiting the phases of the motor. This additional switching circuit is supplied with power by an energy reserve 8 forming a secondary power supply that permits the safety circuit and the controls for the switches by the additional switching circuit to operate for enough time to stop the motor and the motorized wheel, even in the event of loss of the main power supply of the control system.

The energy reserve can be produced on the basis of an electrochemical capacitor or a supercapacitor supplied with power by the main power source 4 through a diode 10 or by a first DC/DC converter, and it is possible for a voltage regulator, with or without a second DC/DC converter, to be inserted between the energy reserve 8 and the additional switching circuit 7 of the safety circuit to bring the voltage of the charged energy reserve to an acceptable voltage for the additional switching circuit 7, for example 4 V to 6 V, whereas the main power source, when active, supplies a voltage of 12 V to 48 V, for example.

The energy reserve may also be produced by a buffer battery if greater autonomy of the safety circuit is required.

The third switches 9a, 9b, 9c for short-circuiting the phases may be produced by MOSFET transistors, which do not need to be dimensioned to control power and have the advantage of requiring very little current to remain switched on.

If the system suffers a loss of electrical energy from the main power supply, the safety circuit may trigger the activation of the third switches to the on mode by means of the additional switching circuit, or this additional switching circuit may trigger said activation automatically following detection of a drop in the main supply voltage. The additional switching circuit 7 may also self-sustain the voltage for activating the switches to the on mode as long as the energy reserve is supplying a residual voltage of a few volts. This energy reserve is adequately dimensioned, for example in terms of storage capacity, to guarantee the current for maintaining the on mode of the third switches for a period of several minutes. This minimum maintenance time is guaranteed by the dimensioning of the energy reserve and the typology of the additional switching circuit.

This circuit is a MOSFET transistor circuit for low power consumption and is configured to control the third switches to close if the voltage on the link 7a drops below a threshold set by the voltage across the terminals of the capacitor 8.

This device for maintaining braking guarantees the motor braking function for a minimum defined period even in the event of loss or failure of the main power supply, and can therefore be considered to be a safety function, obviating the conventional need for an electromechanical brake in the absence of current.

This system may optionally be complemented by a conventional mechanical parking brake if the wheeled vehicle has to be parked for a long time on inclined ground.

In the example shown, the system comprises a manual control 11 acting on the programmable computer 3. The manual control may be provided in addition to a remote control over a communication link 6 from the external controller 5 or may replace the remote control under normal operation, the external controller 5 then being used only to program the system.

The loss of power is shown schematically in FIG. 3 in step 190 and the third switches for short-circuiting the phases of the motor are closed in order to produce the emergency braking in step 200.

The disclosure is not limited to the examples described above, which are provided purely by way of example, but encompasses all of the variants that could be envisaged by a person skilled in the art in the context of the desired protection; in particular, the motor may comprise more than three phases and the converter more than three half-bridges.

What is claimed is:

1. A motorization control system for a mobile electric vehicle comprising an at least three-phase brushless DC motor, an electronic control system for controlling said motor comprising a main electrical supply device supplying power to power half-bridges that supply power to said phases of the motor and that are provided with upper arms fitted with first electronic switches and lower arms fitted with second electronic switches, said electronic control system further comprising a programmable computer having a program for controlling said first and second electronic switches, via control outputs for said electronic switches, to produce at least a first, drive mode of the motor, based on sequential switching control of the switches to create the rotating electric field that turns the motor, and a second, freewheel mode, in which the electronic switches of said power half-bridges are open, characterized in that the motorization control system comprises a safety circuit that is designed to produce an emergency braking mode FS and that is provided with third electronic switches for short-circuiting the lower arms of the half-bridges in parallel with said second electronic switches, said third electronic switches being controlled by an additional switching circuit that is provided with a detection channel for detecting an interruption of the main electrical supply device and/or with a control channel from said programmable computer and that is designed to close said third switches in order to produce said emergency braking, said additional switching circuit being supplied with power by a secondary electrical supply device, wherein the programmable computer comprises a configuration programming mode comprising a traction configuration, in which the computer controls the first and second electronic switches based on said sequential control, a freewheel configuration, in which the computer controls the first and second electronic switches to open, and a motor braking configuration, in which the computer controls the second electronic switches to simultaneously close and the first electronic switches to simultaneously open in a short-circuit mode of the phases of the motor, said computer having an operating mode designed to implement said configurations in accordance with control phases of said mobile vehicle.

2. The motorization control system for a mobile electric vehicle as claimed in claim 1, wherein said additional switching circuit comprises an inhibit output for the control outputs for said first and second switches so as to force said first switches and second switches into the open position when said third switches are closed.

3. The motorization control system for a mobile electric vehicle as claimed in claim 1, wherein the secondary electrical supply device is produced by a capacitor or supercapacitor energy reserve.

4. The motorization control system for a mobile electric vehicle as claimed in claim 1, wherein, the mobile vehicle being a remote-controlled wheeled vehicle, said configurations are initiated by controls received by the computer over a link from an external controller.

5. The motorization control system for a mobile electric vehicle as claimed in claim 1, wherein, the vehicle being a wheeled vehicle actuated by a manual control, the computer is programmed to initiate the freewheel configuration following release of the manual control.

6. The motorization control system for a mobile electric vehicle as claimed in claim 1, wherein, the vehicle being a wheeled vehicle actuated by a manual control, the computer is programmed to initiate the motor braking configuration following release of the manual control.

7. The motorization control system for a mobile electric vehicle as claimed in claim 1, wherein, the vehicle being a wheeled vehicle actuated by a manual control, the computer is programmed to initiate the motor braking configuration beyond a maximum speed of movement of said vehicle.

8. The motorization control system for a mobile electric vehicle as claimed in claim 7, wherein the computer is programmed to initiate the motor braking configuration following release of the manual control, in order to immobilize the vehicle, then to initiate the freewheel configuration when the vehicle has stopped, in order to enable the vehicle to be moved freely by hand.

9. The motorization control system for a mobile electric vehicle as claimed in claim 1, comprising maintaining the motor braking configuration when the motor has stopped, in order to park the vehicle.

10. A mobile electrically motorized vehicle comprising at least one wheel associated with a motor controlled by the motorization control system as claimed in claim 1.

11. A motorization control system for a mobile electric vehicle comprising an at least three-phase brushless DC motor, an electronic control system for controlling said motor comprising a main electrical supply device supplying power to power half-bridges that supply power to said phases of the motor and that are provided with upper arms fitted with first electronic switches and lower arms fitted with second electronic switches, said electronic control system further comprising a programmable computer having a program for controlling said first and second electronic switches, via control outputs for said electronic switches, to produce at least a first, drive mode of the motor, based on sequential switching control of the switches to create the rotating electric field that turns the motor, and a second, freewheel mode, in which the electronic switches of said power half-bridges are open, characterized in that the motorization control system comprises a safety circuit that is designed to produce an emergency braking mode FS and that is provided with third electronic switches for short-circuiting the lower arms of the half-bridges in parallel with said second electronic switches, said third electronic switches being controlled by an additional switching circuit that is provided with a detection channel for detecting an interruption of the main electrical supply device and/or with a control channel from said programmable computer and that is designed to close said third switches in order to produce said emergency braking, said additional switching circuit being supplied with power by a secondary electrical supply device, wherein the computer program comprises:

a traction mode, in which the computer controls the first and second electronic switches based on said sequential control, a freewheeling mode, in which the computer controls the first and second electronic switches to open, and a motor braking mode, in which the computer controls the second electronic switches to simultaneously close and the first electronic switches to simultaneously open in a short-circuit mode of the phases of the motor, said computer having an operating mode designed to implement said configurations in accordance with control phases of said mobile vehicle.

12. The motorization control system for a mobile electric vehicle as claimed in claim 11, wherein, the mobile vehicle being a remote-controlled wheeled vehicle, said configurations are initiated by controls received by the computer over a link from an external controller.

13. The motorization control system for a mobile electric vehicle as claimed in claim 11, wherein, the vehicle being a wheeled vehicle actuated by a manual control, the computer is programmed to initiate the freewheel configuration following release of the manual control.

14. The motorization control system for a mobile electric vehicle as claimed in claim 11, wherein, the vehicle being a wheeled vehicle actuated by a manual control, the computer is programmed to initiate the motor braking configuration following release of the manual control.

15. The motorization control system for a mobile electric vehicle as claimed in claim 11, wherein, the vehicle being a wheeled vehicle actuated by a manual control, the compute is programmed to initiate the motor braking configuration beyond a maximum speed of movement of said vehicle.

16. The motorization control system for a mobile electric vehicle as claimed in claim 11, wherein the computer is programmed to initiate the motor braking configuration following release of the manual control, in order to immobilize the vehicle, then to initiate the freewheel configuration when the vehicle has stopped, in order to enable the vehicle to be moved freely by hand.

17. The motorization control system for a mobile electric vehicle as claimed in claim 11, comprising maintaining the motor braking configuration when the motor has stopped, in order to park the vehicle.

18. The motorization control system for a mobile electric vehicle as claimed in claim 11, wherein said additional switching circuit comprises an inhibit output or the control outputs for said first and second switches so as to force said first switches and second switches into the open position when said third switches are closed.

19. The motorization control system for a mobile electric vehicle as claimed in claim 11, wherein the secondary electrical supply device is produced by a capacitor or supercapacitor energy reserve.

20. A mobile electrically motorized vehicle comprising at least one wheel associated with a motor controlled by the motorization control system as claimed in claim 11.

\* \* \* \* \*